April 15, 1952 P. J. WOLF 2,592,990
ATTACHMENT FOR GARDEN TOOLS
Filed April 13, 1950
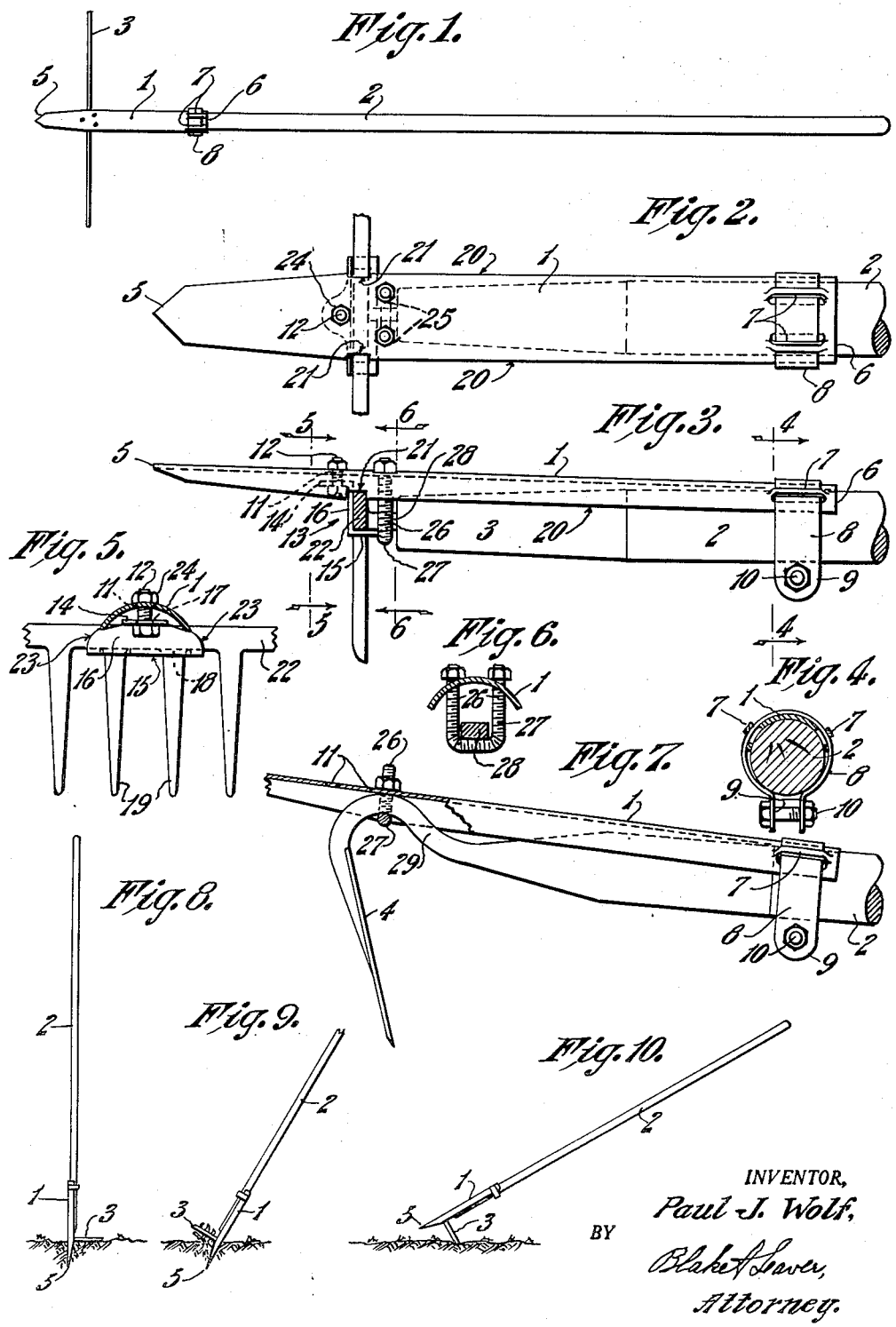
INVENTOR,
Paul J. Wolf,
BY
Blake Lraver,
Attorney.

Patented Apr. 15, 1952

2,592,990

UNITED STATES PATENT OFFICE 2,592,990

ATTACHMENT FOR GARDEN TOOLS

Paul J. Wolf, West Springfield, Mass.

Application April 13, 1950, Serial No. 155,571

2 Claims. (Cl. 56—400.05)

This invention relates to attachments for garden tools, and is particularly pertinent to an attachment for a rake, hoe, or the like.

In the use of a rake, hoe, or the like, when it is desired to temporarily relinquish the tool, it is necessary to lay it on the ground, or lean it against some nearby vertical surface, such as a garage, barn, house, or fence. Such vertical surfaces are not always conveniently available, with the result that the tool must be laid on the ground. In such a position, it becomes a hazard if accidentally stepped on, and an operator must stoop to regain his grip on the handle.

It is an object of this invention to provide a bayonet-like attachment for a rake, hoe, or the like, by means of which the tool may be set in a self-supporting position with the handle in a substantially vertical position, and will remain in such a position until deliberately removed therefrom by the operator.

It is another object of this invention to provide an attachment for a rake, hoe, or the like, which will not interfere with the normal operation of the tool, and which may also be used for the removal of weeds, roots, or other undesirable growths, as they may happen to be met in the normal use of the tool.

Another object of this invention is the provision of an attachment for a rake, hoe, or the like, which will serve as a coupling to firmly secure the handle to the tool portion. It is common experience to have the tang of the tool become loose in its socket in the handle, particularly after long or hard use. This attachment may be firmly secured to both handle and tool, thereby serving as a coupling and eliminating the necessity for a tight engagement of the tool tang or shank in the handle.

A further object of this invention is the provision of an attachment for a rake, hoe, or the like, of the character described above, which is adapted to be easily attached to and removed from any stock or standard make of garden or agricultural tool having a straight handle, and which is simple of construction, capable of withstanding rough treatment, and economical of manufacture.

These, and other objects and advantages of this invention will be clearly and completely disclosed and described in the following specification, the accompanying drawings, and the appended claims.

A preferred embodiment of this invention is illustrated in the accompanying drawings, in which Fig. 1 is a top plan view of the invention attached to a rake, Fig. 2 is a partial view similar to Fig. 1 at an enlarged scale, Fig. 3 is a side elevational view of the device illustrated in Fig. 2, Fig. 4 is a cross sectional view taken on the line 4—4 of Fig. 3, Fig. 5 is a cross sectional view taken on the line 5—5 of Fig. 3, Fig. 6 is a cross sectional view taken on the line 6—6 of Fig. 3, Fig. 7 is a view similar to Fig. 3, illustrating the attachment secured on a hoe, and Figs. 8, 9, and 10 are diagrammatic views illustrating the use of the device.

Referring now to the drawings in detail, in which like numerals refer to like parts throughout, A bayonet-like blade 1, arcuate in cross section, as best illustrated in Figs. 4, 5, and 6, to substantially fit the surface of a round handle 2 of a rake 3 or hoe 4, has one end thereof sharpened at 5 for insertion in the ground. Adjacent the opposite end 6 of the member 1, ears 7 are extruded from the metal of the member 1, and a clamp ring 8, having clamping arms 9, is engaged in the ears 7. The end 6 of the member 1 is clamped on the handle 2 by encircling the handle 2 with the ring 8, and tightening a bolt 10 engaged in the arms 9, as shown in Fig. 4.

Spaced substantially from the end 5 of the member 1, the member 1 is pierced or punched at 11 to receive a fastener 12, such as a bolt and nut, or the like. A Z-shaped clip 13, having top and bottom legs 14 and 15 respectively and a connecting web 16, is provided with a hole 17 in the top leg 14 for receiving the bolt 12, and a slot 18 in the bottom leg 15 for receiving at least two central, spaced teeth 19 of the rake 3. The side edges 20 of the member 1 are notched at 21 to receive a back bar 22 of the rake 3 and edges 23 of the web 16, as shown in Figs. 2, 3 and 5. The member 1 is securely clamped on the rake 3 by removing the bolt 12, slipping the clip 13 upwardly over the rake teeth 19 until the bottom leg 15 engages the under surface of the back bar 22, and reengaging the bolt 12 in the member 1 and top leg 14. Take up on a nut 24 on the bolt 12 will draw the leg 15 tightly against the under side of the back bar 22, and firmly engage the back bar 22 and clip 13 in the notches 21.

Spaced rearwardly of the hole 11, the member 1 is provided with transversally spaced holes 25 for receiving legs 26 of a U-bolt 27. The U-bolt 27 may be used for additional clamping means on the rake 3, if desired, and is used without the clip 13 for clamping the member 1 on the hoe 4, as shown in Fig. 7. The U-bolt 27 engages a tang 28 on the rake 3, or a tang 29 on the hoe 4, as the case may be, and is drawn up tightly by means of nuts 30 engaged on the ends of the legs 26. The U-bolt 27 is preferably threaded full length, and the threads in contact with the tang 28 or 29 provide a firm grip.

With the blade 1 clamped on the handle 2 by means of the ring 8, and on the tool 3 by means of the U-bolt 27 or clip 13, or both, the handle 1 and tool 3 are firmly secured together, without the necessity for a tight fit of the tang 28 in the handle 2.

In operation, when it is desired to relinquish the rake, or hoe, as the case may be, the handle 2 is held in a substantially vertical position and the tool is stabbed downwardly until the pointed end of the blade 1 is engaged in the ground with the blade or tooth portion of the tool resting on the surface of the ground, as illustrated in Fig. 8. The tool will remain firmly supported in this position until it is forcibly pulled in an upward direction to release the blade 1 from its engagement in the ground.

If, in the use of the tool, an objectionable weed or plant is encountered, the tool is turned through substantially 180 degrees, and the end 5 of the blade 1 used to dig the plant from the ground, as shown in Fig. 9.

In the ordinary use of the tool, as shown in Fig. 10, and at the most convenient angle for such use, the point 5 of the blade 4 is well clear of the ground, thus offering no obstacle to the normal use of the rake or hoe to which it is attached.

Having thus described my invention, what I claim is:

1. An attachment for a garden rake having a straight round handle and a toothed rake portion provided with a tang engaged in said handle, said attachment comprising a long, relatively narrow, parallel-sided blade, arcuate in cross section and pointed at one end for insertion in the ground, a clamping ring secured on said blade adjacent the end of said blade opposite said pointed end and adapted to encircle said handle, a Z-shaped clip member having spaced parallel leg members and a connecting web, one of said leg members being provided with a slot for receiving at least two of the teeth on said rake portion, and fastening means for securing the opposite of said leg members to said blade at a point intermediate said clamping ring and said pointed end.

2. An attachment for a garden rake having a straight round handle and a toothed rake portion provided with a tang engaged in said handle, said attachment comprising a long, relatively narrow, parallel-sided blade, arcuate in cross section and pointed at one end for insertion in the ground, a clamping ring secured on said blade adjacent the end of said blade opposite said pointed end and adapted to encircle said handle, a Z-shaped clip member having spaced parallel leg members and a connecting web, one of said leg members being provided with a slot for receiving at least two of the teeth on said rake portion, fastening means for securing the opposite of said leg members to said blade at a point intermediate said clamping ring and said pointed end, and a U-bolt removably secured on said blade between said clip and said clamping ring and adapted to encircle said tang.

PAUL J. WOLF.

REFERENCES CITED

The following references are of record in the file of this patent:

UNITED STATES PATENTS

| Number | Name | Date |
|---|---|---|
| 291,504 | Gates | Jan. 8, 1884 |
| 498,007 | Gallt | May 23, 1893 |
| 1,275,382 | Camp | Aug. 13, 1918 |
| 2,268,066 | Brooke | Dec. 30, 1941 |

FOREIGN PATENTS

| Number | Country | Date |
|---|---|---|
| 183,041 | Great Britain | July 20, 1922 |